US008707337B2

(12) United States Patent
Hernandez et al.

(10) Patent No.: US 8,707,337 B2
(45) Date of Patent: Apr. 22, 2014

(54) DISPATCH API THAT PERMITS MIDLETS TO INITIATE DISPATCH CALLS

(75) Inventors: Edwin A. Hernandez, Coral Springs, FL (US); Xin Guan, Changshu (CN); Xiao-Guo Zhang, Nanjing (CN)

(73) Assignee: Motorola Mobility LLC, Libertyville, IL (US)

( * ) Notice: Subject to any disclaimer, the term of this patent is extended or adjusted under 35 U.S.C. 154(b) by 1015 days.

(21) Appl. No.: 11/554,942

(22) Filed: Oct. 31, 2006

(65) Prior Publication Data

US 2008/0104572 A1 May 1, 2008

(51) Int. Cl.
G06F 3/00 (2006.01)
G06F 9/455 (2006.01)

(52) U.S. Cl.
USPC ................................ 719/328; 719/319; 718/1

(58) Field of Classification Search
None
See application file for complete search history.

(56) References Cited

U.S. PATENT DOCUMENTS

| 6,708,276 | B1  |   | 3/2004  | Yarsa et al.       |         |
|-----------|-----|---|---------|--------------------|---------|
| 6,742,123 | B1  | * | 5/2004  | Foote              | 726/22  |
| 7,010,610 | B1  | * | 3/2006  | Ringhof et al.     | 709/232 |
| 7,418,718 | B2  | * | 8/2008  | Liu et al.         | 719/328 |
| 7,434,224 | B2  | * | 10/2008 | Lescouet et al.    | 719/319 |
| 7,451,484 | B1  | * | 11/2008 | Nadalin et al.     | 726/19  |
| 7,895,594 | B2  | * | 2/2011  | Kirilline et al.   | 718/1   |
| 2002/0144233 | A1 | * | 10/2002 | Chong et al.      | 717/105 |
| 2003/0149801 | A1 | * | 8/2003  | Kushnirskiy       | 719/328 |
| 2004/0127190 | A1 |   | 7/2004  | Hansson et al.    |         |
| 2006/0021029 | A1 | * | 1/2006  | Brickell et al.   | 726/22  |
| 2006/0031408 | A1 |   | 2/2006  | Lin                |         |
| 2006/0031941 | A1 | * | 2/2006  | Xiao et al.        | 726/27  |
| 2007/0019656 | A1 | * | 1/2007  | Martin et al.      | 370/401 |
| 2007/0074034 | A1 | * | 3/2007  | Adams et al.       | 713/176 |
| 2007/0168953 | A1 | * | 7/2007  | Diez et al.        | 717/118 |
| 2008/0144796 | A1 | * | 6/2008  | Ringland et al.    | 379/210.01 |

FOREIGN PATENT DOCUMENTS

EP   1564957 A1   8/2005

OTHER PUBLICATIONS

"Towards a Java Based Enterprise Client for Small device", Bush, 2002, pp. 1-47.*
"Supporting Programmale Handoff in Mobile Networks", Kounavis, 1999, pp. 1-11.*
"Information Module Profile Next generation", Java Community, 2005, pp. 197.*
"An Adaptive Model for Reconfigurable Autonomous Services using Profiling", Truchat, 2006, pp. 1-13.*
Patent Cooperation Treaty, "PCT Search Report and Written Opinion of the International Searching Authority" for International Application No. PCT/US2007/081168 dated Jul. 9, 2008, 11 pages.

* cited by examiner

Primary Examiner — Tuan Dao

(57) ABSTRACT

The present invention can include a method for initiating a dispatch call. The method can include a step of receiving a dispatch call request from a MIDlet disposed within a JAVA™ mobile edition (ME) environment of a communication device, such as a mobile telephony device. The method can determine whether the MIDlet is in a domain having access to dispatch call functions implemented within a native environment of the communication device. When the domain has access, a dispatch communication session can be established for the dispatch call request. The dispatch communication session can execute within the native environment without exiting the JAVA™ ME environment. When the domain lacks access, the dispatch call request can be conveyed to the native environment, the MIDlet can quit executing, the JAVA™ ME environment can be exited, and a dispatch communication session for the dispatch call request can be established from within the native environment.

20 Claims, 2 Drawing Sheets

DISPATCH API THAT PERMITS MIDLETS TO INITIATE DISPATCH CALLS

BACKGROUND

1. Field of the Invention

The present invention relates to the JAVA platform Micro Edition (ME) and, more particularly, to a dispatch API that permits MIDlets to initiate dispatch calls.

2. Description of the Related Art

JAVA platform Micro Edition (JAVA ME) is a collection of JAVA Application Program Interfaces (APIs) for the development of software for resource-constrained devices, such as mobile phones, personal data assistants (PDAs), navigation devices, and the like. JAVA ME devices implement a profile, such as the Mobile Information Device Profile (MIDP), which is part of the JAVA ME specification. Application programs written for JAVA ME virtual machines are called MIDlets. MIDlets are often used to create games and applications for mobile phones.

MIDlet developers often want to be able to write MIDlets that utilize low level capabilities of the host device. Providing access to device resources, however, requires a level of trust between the executing application, the device, and the user. MIDP handles trust issues using protection domains, which are a collection of permissions that can be granted to MIDlets. Standard protection domains include a trusted domain and an untrusted domain. When a MIDlet is installed, that MIDlet is bound to an appropriate protection domain.

One way to establish a level of trust for a MIDlet is to sign the MIDlet using a X.509 based certificate. That is, a MIDlet designer can obtain a public key (PKI) that is used to authenticate the MIDlet upon installation. A number of different certification authorities, such as VERISIGN, GEOTRUST, THAWTE, and the like, exist who can provide public keys that permit MIDlets to be installed within a trusted domain. Unfortunately, different mobile phones behave differently and no current signing authority appears to work seamlessly for every device. Thus, MIDlet designers are left with uncertainty as to whether their MIDlets will be trusted or not, which can prevent these developers from attempting to utilize resources only available when the MIDlet is part of a trusted domain.

Even when a MIDlet designer is granted rights to a trusted domain, many resources of the device are not currently accessible. For example, at present no JAVA ME APIs exist that support Push-To-Talk or dispatch capabilities.

SUMMARY OF THE INVENTION

A JAVA platform Micro Edition (JAVA ME) Application Program Interface (API) for handling dispatch calls. The JAVA API can include a new dispatch initiation method referred to as makeCall, which can be a method of a JavaCall class. When a Push-To-Talk call is initiated using the make-Call method, resulting behavior can be based upon a protection domain to which an invoking MIDlet belongs. For example, when the makeCall method is invoke from an untrusted domain, the JAVA ME environment can be exited and the dispatch call can be executed within a native environment of a mobile device. When the makeCall method is invoked from a trusted domain, the native interface can be called from the JAVA ME environment, where the native interface handles the dispatch call. Processes within the JAVA ME environment can be optionally suspended while the native interface handles the dispatch call.

The present invention can be implemented in accordance with numerous aspects consistent with the material presented herein. For example, one aspect of the present invention can include a JAVA ME API comprising a JAVA ME method. The JAVA ME method can initiate a dispatch call from within a JAVA ME environment of a mobile device. The method can be invoked from an untrusted MIDlet or from a trusted MIDlet, which affects behavior. When the method is invoked from an untrusted MIDlet, the JAVA ME environment can be automatically exited, control can be given to a native environment of the mobile device, and the dispatch call can be completed within the native environment. When the JAVA ME method is invoked from a trusted MIDlet, a dispatch interface that handles the dispatch call can be invoked without exiting the JAVA ME environment.

Another aspect of the present invention can include a method for initiating a dispatch call. The method can include a step of receiving a dispatch call request from a MIDlet disposed within a JAVA ME environment of a communication device, such as a mobile telephony device. The method can determine whether the MIDlet is in a domain having access to dispatch call functions implemented within a native environment of the communication device. When the domain has access, a dispatch communication session can be established for the dispatch call request. The dispatch communication session execute within the native environment without exiting the JAVA ME environment. When the domain lacks access, the dispatch call request can be conveyed to the native environment, the MIDlet can quit executing, the JAVA ME environment can be exited, and a dispatch communication session for the dispatch call request can be established from within the native environment.

Still another aspect of the present invention can include a mobile device having two or more modes and having a dispatch capability that is able to be invoked from a MIDlet. The mobile device can include a JAVA ME environment and a native environment. The JAVA ME environment can include at least one MIDlet, which is installed in a protection domain. The native environment can include at least one dispatch method for establishing a dispatch session. The installed MIDlet can include a JAVA ME method for initiating a dispatch call. When the protection domain is an untrusted domain and when the JAVA ME method is invoked, the JAVA ME environment can be automatically exited, control can be given to a native environment of the mobile device, and the dispatch method can be executed within the native environment. When the protection domain is a trusted domain and when the JAVA ME method is invoked, the dispatch method can be executed without exiting the JAVA ME environment.

It should be noted that various aspects of the invention can be implemented as a program for controlling computing environment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
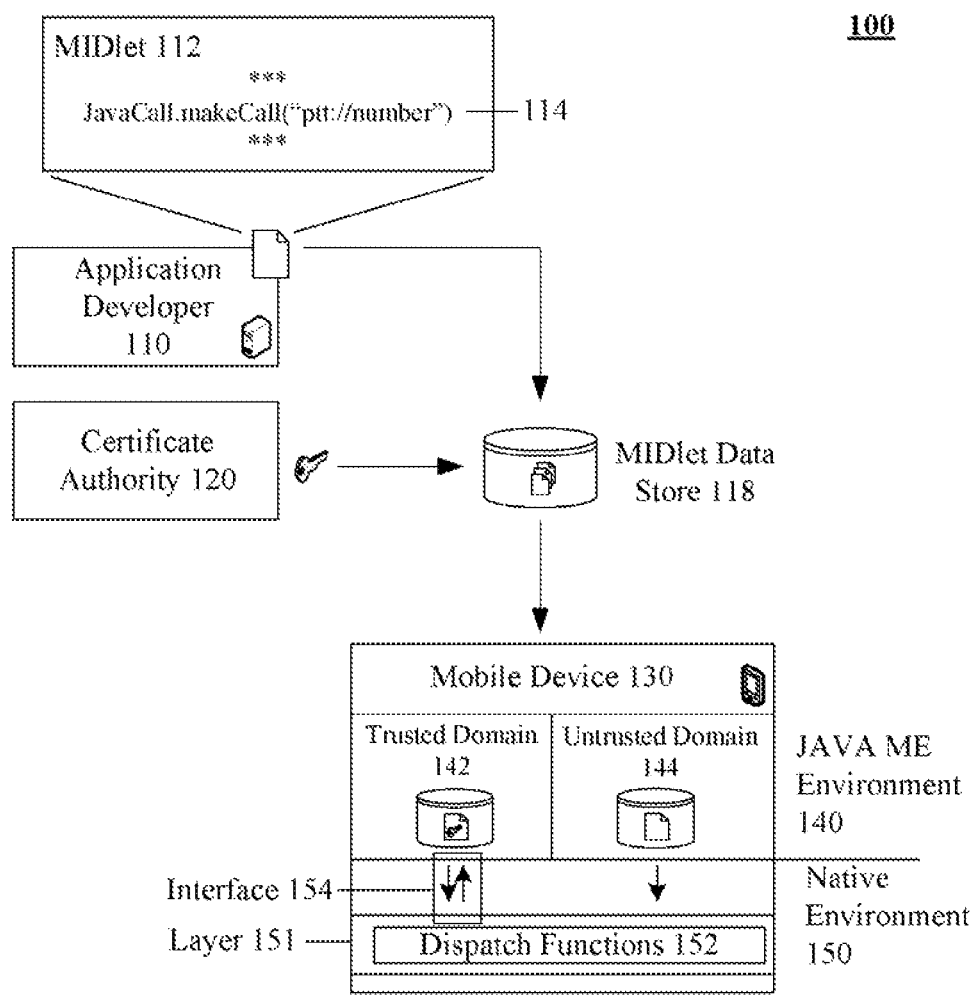
FIG. 1 is a schematic diagram of a system for initiating dispatch calls from a JAVA ME environment in accordance with an embodiment of the inventive arrangements disclosed herein.

FIG. 1 is a schematic diagram of a system 100 for initiating dispatch calls from a JAVA platform Micro Edition (JAVA ME) environment 140 in accordance with an embodiment of the inventive arrangements disclosed herein. The invention teaches that a MIDlet 112 can call a method 114 that initiates a dispatch call. Behavior of the method 114 depends on whether the MIDlet 112 belongs to a trusted domain 142 or an untrusted domain 144.

When method 114 is invoked from a trusted domain 142, a dispatch interface 154 can be invoked for communicating with a layer 151 of a native environment 150, where the dispatch interface 154 causes one or more dispatch functions 152 to execute. In one embodiment, JAVA ME environment 140 processes can be suspended while the dispatch functions 152 execute, and the suspended processes can resume once the dispatch actions complete.

The untrusted domain 144 can lack privileges to directly access layer 151. Instead, the untrusted layer 144 can initiate a programmatic action that exits the JAVA ME environment 140. One or more dispatch functions 152 can then be directly invoked from the native environment 150. Notably, the one or more dispatch functions 152 can establish a dispatch session also referred to as a Push-To-Talk session between mobile device 130 and another mobile device (not shown). This other mobile device can be associated with a phone number specified by method 114.

It should be appreciated that application developers 110 create MIDlets, such as MIDlet 112, and place them in a data store 118 accessible from one or more mobile devices 130. Certificate authority (CA) 120 can issue a key that indicates that a stored MIDlet 118 is to be trusted. When a MIDlet 112 is downloaded to device 130 and installed, it is placed in a protection domain.

A protection domain can determine whether permissions are granted or denied. Standard protection domains include the trusted domain 142 and an untrusted domain 144. Other protection domains exist, such as a minimum domain and a maximum domain, which are defined as part of the emulator included in the J2Me Wireless Toolkit 2.0. In the context of system 100, trusted domain 142 can be any protection domain that allows access to layer 151 and interface 154. That is, trusted domain 142 allows the environment 140 direct access to dispatch functions 152 in native environment 152 and untrusted domain denies environment 140 this direct access.

In one embodiment, when the dispatch call is initiated by the mobile device 130, a status indicator can be sent to a server of the service provider and/or to an end device that is to receive the dispatch call. This status indicator can indicate whether the invoking MIDlet 112 is trusted or untrusted. The status indicator can provide additional information about the MIDlet 112 and/or about the mobile device 130, which can cause the service provider and/or the dispatch receiving device to take a further programmatic action. For example, the service provider can automatically send a digital message to a user of device 130 and/or to a developer of the MIDlet 112 that indicates that the MIDlet 112 installed in device 130 is currently untrusted and that enhanced functionally can be provided if the MIDlet 130 were certified by an authorized CA 120.

As used herein, MIDlet 112 can be a JAVA program written for embedded devices, and more specifically to a JAVA ME compliant virtual machine. For example, MIDlet 112 can be a subclass of the javax.microedition.MIDlet.MIDlet class that is defined by MIDP. In the present invention, the term MIDlet 112 is to be construed broadly to include any standard based upon or derived from the JAVA ME platform and is not to be limited to any particular specification version.

As used herein, JAVA is a platform independent, object-oriented programming language. JAVA code can be compiled into byte code, which can be run within a virtual machine.

The JAVA ME environment 140 is an environment that includes a virtual machine capable of executing byte code that is configured to run on resource constrained devices, such as device 130. Different virtual machines can be customized for a different platforms, which results in software written for environment 140 being platform independent. The environment 140 can also include a set of APIs suitable for tailored runtime environments of specific resource constrained devices. In one embodiment, the environment 140 can permit device 130 to implement a profile that is aimed at a mobile device, such as the MIDP. As used in system 100, JAVA ME environment 140 can be any edition, version, or derivative of the JAVA platform that is targeted at small, standalone, or connectable consumer and embedded devices. In another embodiment the JAVA ME method is configured to execute from within a single user virtual machine and is also configured to execute within a Multi-user virtual machine (MVM).

Mobile Device 130 can be a mobile or embedded communication device having dispatch capabilities. The mobile device 130 can have more than one mode and can therefore be a dual mode or a multimode device. Mobile device 130 can include, but is not limited to, a mobile telephone, a navigation system, a personal data assistant (PDA), a wearable computer, a media player, a mobile entertainment system, and the like.

CA 120 can be an entity which issues digital certificates for use by other parties. As such, the CA 120 is a trusted third party for purposes of a public key infrastructure (PKA) scheme used to certify MIDlet 112. Examples of CAs 120 can include, but are not limited to, Netrust, ENTRUST, PGP, THAWTE, GEOTRUST, DigiCert, and VERISIGN.

In one embodiment, a service provider that provides dispatch services can act as a CA 120. Further, the service provider can automatically and dynamically sign or certify MIDlet 112, provided that developer 110, device 130, and/or user specific conditions are met, as established by the service provider. When automatically certified by a service provider, an associated MIDlet 112 can be placed in trusted domain 142.

Native Environment 150 can be a non-JAVA ME environment of the mobile device 130, which includes dispatch functionality. For example, the native environment 150 can be an Integrated Dispatch Enhanced Network (iDEN) compliant environment or a QCHAT compliant environment. Additionally, multiple different PTT technologies can be utilized by a single mobile device 130 depending upon resources available proximate to the device 130. For example, mobile device 130 can automatically use iDEN technology by default for PTT functions, but can seamlessly use QCHAT based technology for the dispatch call 114 when iDEN coverage is unavailable. Further, the environment 150 is not limited to environments implementing any particular PTT technology. For example, system 100 can utilize a TALKGROUP based technology, a Selective Dynamic Group Call (SDGC) based technology, a READYLINK based technology, a VoIP PTT based technology, a KODIAK NETWORKS based technology, and the like.

Data store 118 can be a physical or virtual storage space configured to store digital information. Data store 118 can be physically implemented within any type of hardware including, but not limited to, a magnetic disk, an optical disk, a semiconductor memory, a digitally encoded plastic memory, a holographic memory, or any other recording medium. The data store 118 can be a stand-alone storage unit as well as a storage unit formed from a plurality of physical devices. Additionally, information can be stored within data store 118 in a variety of manners. For example, information can be stored within a database structure or can be stored within one or more files of a file storage system, where each file may or may not be indexed for information searching purposes. Further, data store 118 can utilize one or more encryption mechanisms to protect stored information from unauthorized access.

The various components (items 110, 118, 120, and 130) illustrated in system 100 can be communicatively linked to each other via a network (not shown). The network can include any hardware/software/and firmware necessary to convey digital content encoded within carrier waves. Digital content can be contained within analog or digital signals and conveyed though data or voice channels. The networks can include network equipment, such as routers, data lines, hubs, and intermediary servers which together form a data or telephony network. The network can include mobile communication components, such as cellular communication towers, two-way radio transceiving components, and the like.

Figure 2:
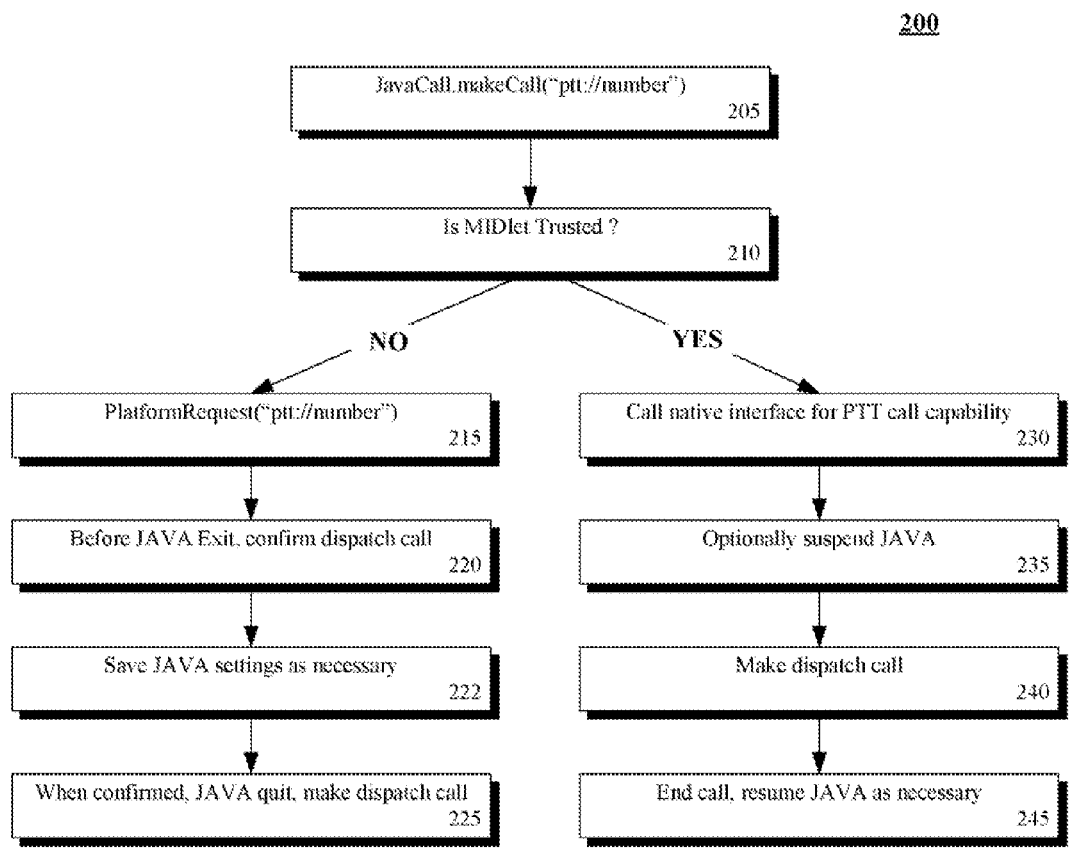
FIG. 2 is a flow chart of a method for initiating dispatch calls in a dual mode device in accordance with an embodiment of the inventive arrangements disclosed herein.

FIG. 2 is a flow chart of a method 200 for initiating dispatch calls in a dual mode device in accordance with an embodiment of the inventive arrangement disclosed herein. Method 200 can be performed in the context of a system 100.

Method 200 can begin at step 205, where a dispatch call method can be invoked from a MIDlet. The method can be a makeCall method of a JavaCall class. The makeCall method can receive a Uniform Resource Identifier (URI) formatted input string. The URI's scheme name can be associated with a dispatch call (e.g. "ptt" for Push-To-Talk) and the scheme specific part of the URI can identify a number that is to be called. For example, the format for the dispatch method of step 205 can be JavaCall.makeCall ("ptt://number"). In one embodiment, the makeCall method can be overloaded to also handle voice based calls. For example, JavaCall.makeCall ("voice//number") can initiate a voice based call.

In step 210, a determination can be made as to whether the MIDlet initiating the dispatch call is trusted. If not, the method can branch to step 215, where a platform request ( ) method can be utilized to initiate a dispatch call. The input string for the platformrequest ( ) method can be formatted in the same manner as the input string used by the makeCall method. In step 220, before an exit from the JAVA ME environment occurs, the dispatch call can be confirmed. Additionally, any JAVA settings can be optionally saved as necessary. In step 225, when the dispatch call is confirmed, JAVA ME processes can quit, control can be passed to a native environment that implements the dispatch call, and the dispatch call can be made.

When the MIDlet of step 210 is trusted, the method can proceed to step 230, where a call to a native interface can be made. For example, an INativeNumberEntry interface can be called. In step 235, JAVA processes can be optionally suspended. In step 240, the dispatch call can be made. In step 245, the dispatch call can end and any previously suspended JAVA processes can be resumed.

It should be appreciated that step 205 of invoking the dispatch call method can occur responsive to many different conditions. For example, a user of a mobile device can select an option to invoke the dispatch method from within a JAVA ME based interface. In another example, an application executing on the mobile device can automatically initiate the dispatch method based upon occurrences of previously established conditions without requiring an explicit user selection of a dispatch initiation option.

In still another example, a mobile terminal can receive a dispatch request via an electronic message, such as an email message, a Short Message Service (SMS) message, a Multimedia Message Service (MMS) message, an ASCII/Unicode message, and the like. The electronic message can include an embedded URI string (e.g., ptt://number) for initiating a dispatch. This string can be interpreted by a browser element or an application management system (AMS) as a dispatch call. The element or AMS can apply the method 200 or can launch JAVA to handle an associated MIDlet, which in turn handles the dispatch request in accordance with method 200.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computer program product including computer readable instruction code stored on at least one non-transitory storage medium for implementing an Application Program Interface (API) upon being executed by a processor, the instruction code comprising:

a dispatch application that initiates a dispatch call from within a virtual machine environment of a mobile device, the virtual machine environment having a trusted domain and an untrusted domain, wherein when said dispatch application is invoked while bound to the untrusted domain the virtual machine environment is automatically exited;

control is given to dispatch functionality in a native environment of the mobile device; and the dispatch call is performed within the native environment by the dispatch functionality;

and wherein when said dispatch application is invoked while bound to the trusted domain a dispatch interface that handles the dispatch call is invoked without exiting the virtual machine environment and the dispatch call is performed by the dispatch application utilizing the dispatch functionality via the dispatch interface.

2. The computer program product of claim 1, wherein the dispatch interface is an interface implemented in a layer of the native environment, wherein when said dispatch application is invoked from the trusted domain:

virtual machine environment processes are automatically suspended before the dispatch interface is called; and virtual machine environment processes are automatically resumed after dispatch programmatic actions associated with the dispatch interface are completed.

3. The computer program product of claim 1, wherein when said dispatch application is invoked from the untrusted domain, a platformrequest( )method is utilized to initiate the dispatch call.

4. The computer program product of claim 1, wherein when said dispatch application is invoked from the untrusted domain:

before the virtual machine environment is exited and control is given to the native environment, a programmatic action that confirms whether the dispatch call is to a proper dispatch number is executed, wherein when the programmatic action confirms the dispatch call, the virtual machine environment is exited and control is given to the native environment.

5. The computer program product of claim 1, wherein the dispatch application is a makeCall( ) method of the JavaCall class.

6. The computer program product of claim 1, wherein the dispatch application accepts a Uniform Resource Identifier (URI) as an input string, wherein said URI has a scheme name for a namespace specifically associated with a dispatch call, and wherein said URI has a scheme-specific part that identifies a number that is to be called.

7. The computer program product of claim 6, wherein the same dispatch application is an overloaded dispatch application that is able to initiate a voice call, wherein when initiating a voice call, the URI has a scheme name for a namespace specifically associated with a voice call, and wherein said URI has a scheme-specific part that identifies a number that is to be called.

8. The computer program product of claim 1, wherein the dispatch application is configured for native environments that utilize an Integrated Dispatch Enhanced Network (iDEN) based technology and is also configured for native environments that utilize a QChat based technology.

9. The computer program product of claim 1, wherein when said dispatch application method is invoked from the untrusted domain:

a user is prompted for permission to initiate the dispatch call from the untrusted domain, wherein exiting the virtual machine environment is dependent upon a user response.

10. The computer program product of claim 1, wherein when said dispatch application is invoked from the untrusted domain:

a user is provided an option to have a network element reevaluate the trust status of the dispatch application, wherein the network element is granted an ability to selectively and to automatically sign the dispatch application, and wherein signed applications are automatically treated as trusted applications for purposes of the accessing the dispatch API.

11. The computer program product of claim 1, wherein said dispatch application is further configured to send a status indicator to at least one of a server of a service provider and an end device specified by the dispatch call, said status indicator indicating whether an invoking dispatch application is trusted or untrusted.

12. The computer program product of claim 1, wherein the dispatch application is configured to execute from within a single user virtual machine and is also configured to execute within a Multi-user virtual machine (MVM).

13. The computer program product of claim 12, wherein the dispatch API is configured to be utilized from within a Multi-user virtual machine (MVM) environment of the mobile device, wherein a plurality of MIDlets in the MVM are able to simultaneously execute instances of the dispatch application.

14. A method for initiating a dispatch call comprising:

receiving a dispatch call request from a dispatch application disposed within a virtual machine environment of a communication device, the virtual machine environment having a trusted domain and an untrusted domain;

determining whether the dispatch application is bound to the trusted domain or the untrusted domain in response to receiving the dispatch call request;

when the dispatch application is bound to the trusted domain, establishing a dispatch communication session for the dispatch call request, said dispatch communication session controlled by the dispatch application without exiting the virtual machine environment and utilizing a dispatch interface to access dispatch functionality in a native environment of the communication device; and when the dispatch application is bound to the untrusted domain, conveying the dispatch call request to the dispatch functionality in the native environment, quitting the dispatch application, exiting the virtual machine environment, and establishing a dispatch communication session for the dispatch call request from within the native environment with the dispatch functionality.

15. The method of claim 14, wherein the trusted domain is a trusted domain of a Mobile Information Device Profile (MIDP) and wherein the untrusted domain is an untrusted domain of the Mobile Information Device Profile.

16. The method of claim 14, wherein when the dispatch application is bound to the trusted domain, suspending active processes in the virtual machine environment before establishing the dispatch communication session, wherein after the dispatch session is completed, suspended processes are automatically resumed.

17. The method of claim 14, wherein when the dispatch application is bound to the trusted domain at least one active processes in the virtual machine environment unrelated to the dispatch communication session continues executing during the dispatch communication session.

18. The method of claim 17, wherein transceiving functions associated with the at least on active process in the virtual machine environment unrelated to the dispatch communication session are disabled during the dispatch communication session.

19. The method of claim 14, wherein said steps of claim 14 are steps performed by at least one machine in accordance with at least one computer program stored within a machine readable memory, said computer program having a plurality of code sections that are executable by the at least one machine.

20. A mobile device having a plurality of modes including a capability that is able to be invoked from an application stored in a memory of the mobile device, the mobile device comprising:

a virtual machine environment comprising the application, said application being installed in a protection domain of the virtual machine environment, the protection domain being either unstrusted or trusted;

a native environment comprising functionality for establishing a session from the native environment;

said at least one application including a method for initiating a an operation of the mobile device, wherein when said protection domain is the untrusted domain and when the method is invoked:

the virtual machine environment is automatically exited;

control is given to a native environment of the mobile device; and the method is executed by the functionality within the native environment;

and wherein when said protection domain is the trusted domain and when the method is invoked:

the method is executed without exiting the virtual machine environment wherein the method accesses the functionality of the native environment via an interface between the virtual machine environment and the native environment.

* * * * *